Jan. 25, 1966  N. E. SHURTLIFF  3,230,833
TOOL HOLDER
Filed Feb. 8, 1965  2 Sheets-Sheet 1
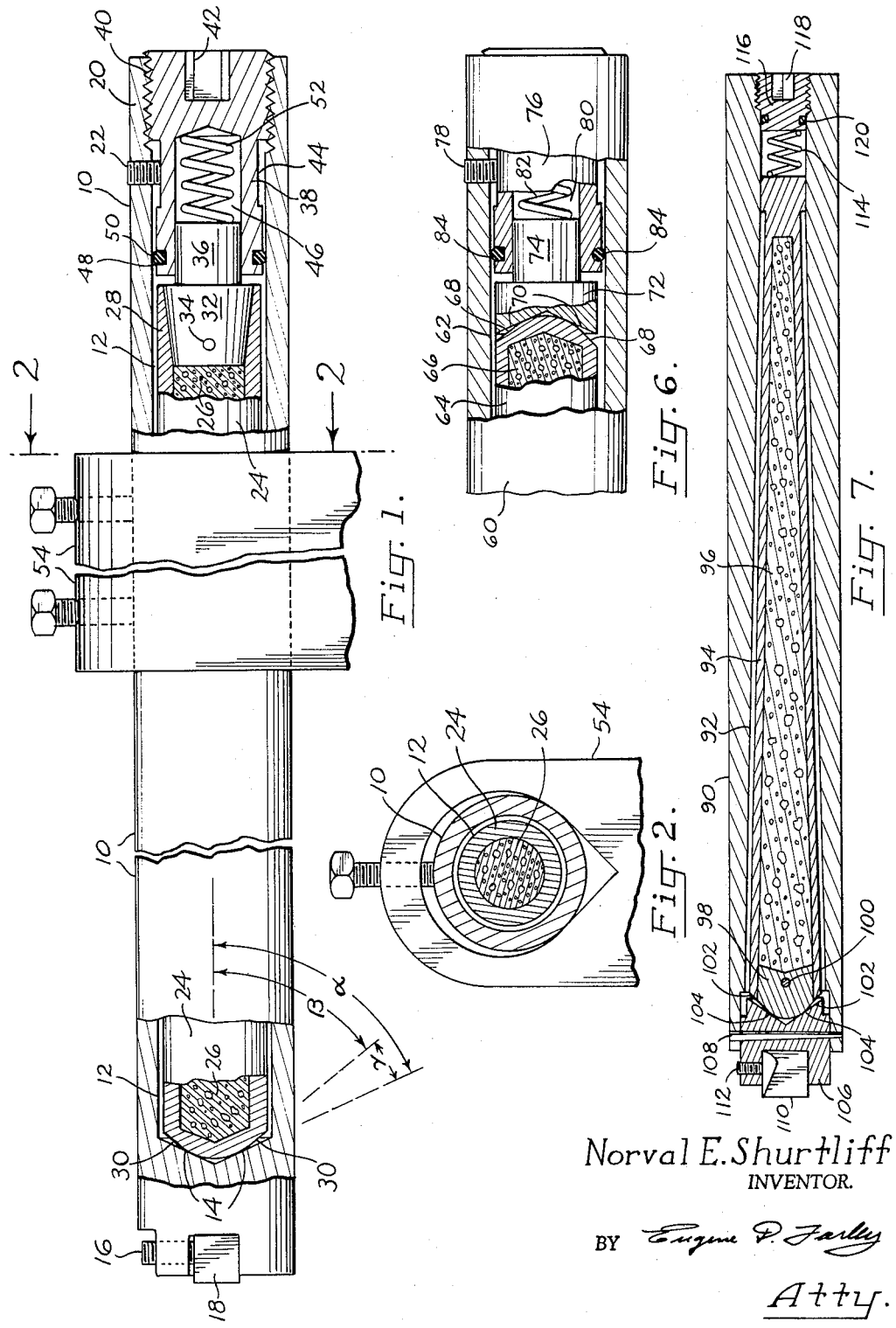
Norval E. Shurtliff
INVENTOR.
BY Eugene P. Farley
Atty.

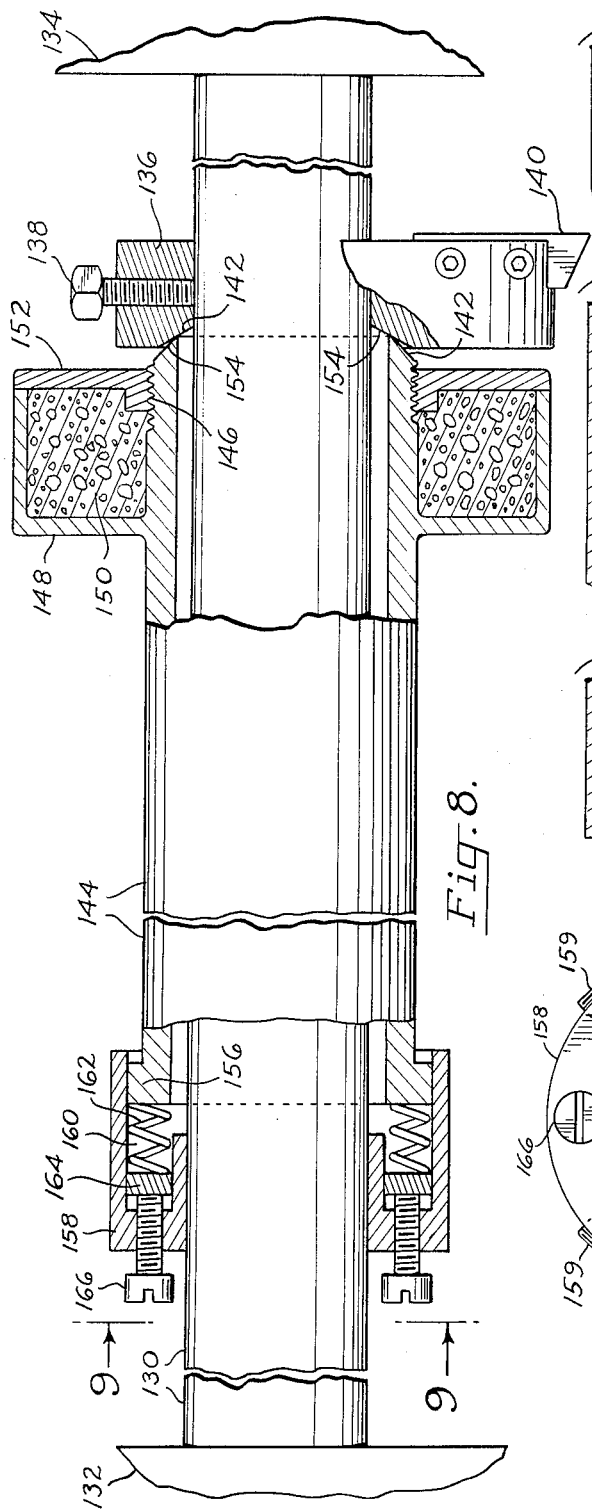

United States Patent Office 3,230,833
Patented Jan. 25, 1966

3,230,833
TOOL HOLDER
Norval E. Shurtliff, 908 1st Place, Springfield, Oreg.
Filed Feb. 8, 1965, Ser. No. 431,044
20 Claims. (Cl. 90—11)

This application is a continuation-in-part of the patent application of Norval E. Shurtliff, Serial No. 186,071, filed April 9, 1962 for Boring Bar, and now Patent No. 3,172,308.

This invention relates to tool holders. It pertains particularly to boring bars damped against vibration and hence relatively free from chatter. Although the invention is described with particular reference to boring bars, it also is applicable to various tools employed in milling machines, boring machines, grinding machines, turret lathes, engine lathes, and any other equipment where a cutting tool and the work are rotated relative to each other.

The conventional boring bar consists of a solid cylindrical steel shaft having a reach end and a shank end. Tool mounting means are present on the reach end for mounting the selected cutting tool. The mounting means may be permanently affixed to the shaft or affixed to a quick change removable head. The bar normally is held stationary by the shank end and the boring operation accomplished by rotating the work past and against the cutting tool.

The maximum speed at which the work may be rotated is limited by two factors. The first is the speed at which the cutting tool is damaged by excessive heat generated by the cutting operation. The second is the speed at which the boring bar begins to chatter.

Boring bar chattering is caused by the bar springing transversely to its longitudinal axis in the direction of the work. The bar will spring in this direction until its restoring force exceeds the force required to return it to its equilibrium position. When this condition exists, the bar will spring back towards its equilibrium position, gouging the work surface. Repetition of this sequence at rapid intervals causes chattering.

Chattering was not a problem before the advent and almost exclusive use of present day carbide cutting tools. It was not a problem with the high speed steel cutting tools formerly used since the operating speeds capable of causing chatter generally are above those speeds that cause heat damage to high speed steel cutting tools.

Today, with the almost exclusive use of carbide cutting tools, this no longer is true. In fact, insofar as heat damage to the tool is concerned operating speeds may be increased so far above the speeds at which conventional boring bars begin to chatter that the advantage of using carbide cutting tools in large measure is lost. An improved anti-chatter tool holder accordingly is needed to accommodate the improved carbide cutting tools currently available.

It thus is the general object of the present invention to provide a tool holder, specifically a boring bar, which does not chatter when used at high speeds and which as a consequence materially increases the output potential of a given machine while contemporaneously improving the quality of its work.

Another object of the present invention is to provide a tool holder which is applicable to mounting a wide variety of cutting tools in machines of diverse types.

Still another object of the present invention is the provision of a work holder, specifically a boring bar, which is simple in its construction, easily made, and possesses a long service life.

Considered in its broadest aspect, the presently described tool holder providing the foregoing and other advantages comprises a support bar having on it means for mounting a cutting tool. A heavy stabilizing rod having a high moment of inertia is mounted on the bar, internally or externally, substantially coaxially with the bar and laterally spaced from it.

The bar and stabilizing rod are so arranged with respect to each other as to provide abutment means on the bar for longitudinal abutment by one end of the stabilizing rod. The abutment means and the abutting stabilizing rod end have meeting bearing surfaces which are divergent with reference to each other as well as to the longitudinal axis of the bar.

The degree of divergence of the bearing surface of the abutment means with reference to the longitudinal axis of the bar is greater than the degree of divergence of the bearing surface of the stabilizing rod with respect to the longitudinal axis of the bar. The bearing surfaces accordingly are free to move relative to each other, the bearing surface of the abutment means providing an inclined plane adapted to translate lateral displacement of the bar into longitudinal displacement of the stabilizing rod.

Resilient compression means are mounted on the bar and positioned to oppose the longitudinal displacement of the stabilizing rod, returning it toward a centered equilibrium position after each longitudinal displacement.

As a consequence of this arrangement, any incipient chattering is damped immediately and the tool and the work may be rotated relatively to each other at a very high rate of speed without damage to either, thereby realizing the full potential of carbide cutting tools and materially increasing output without detriment to the work.

Considering the foregoing in greater detail and with particular reference to the drawings, wherein:

FIG. 1 is a view in side elevation, partly in section, of the herein described work holder in one of its embodiments in which the stabilizing rod is mounted internally of the holder;

FIG. 2 is a transverse sectional view taken along line 2—2 of FIG. 1;

FIG. 3 includes schematic sectional views of the reach ends of hollow support bars which may be employed in the tool holder of the invention, illustrating various types of abutment surfaces which may be present;

FIG. 4 includes schematic views illustrating different silhouettes of stabilizing rods which may be employed in conjunction with the hollow bars of FIG. 3;

FIG. 5 includes fragmentary, schematic sectional views of the reach ends of stabilizing rods which may be employed in the tool holders of the invention, illustrating various shapes of end bearing surfaces which cooperate in obtaining the desired stabilizing effect with the various abutment surfaces of the hollow bars illustrated in FIG. 3;

FIG. 6 is a fragmentary view in side elevation, partly in section, showing the shank end of the tool holder and illustrating an alternate form of construction;

FIG. 7 is a longitudinal sectional view of the tool holder of the invention illustrating the use in the holder of a stabilizing rod having a longitudinally beveled silhouette;

FIG. 8 is a foreshortened view in side elevation, partly in section, of still another form of the presently described tool holder, wherein the stabilizing rod is mounted externally; and FIG. 9 is a transverse, sectional view taken along line 9—9 of FIG. 8.

The tool holder of the embodiments of FIGS. 1–5 inclusive includes an elongated, hollow support bar 10 having a central, longitudinally extending bore 12. The inner end of bore 12 terminates in a tapered end wall formed by abutment surfaces 14. These are outwardly divergent from the longitudinal axis of the bar at an angle α of, for example, from 20–85°.

Abutment surfaces 14 may, however, assume various configurations. In addition to the straight beveled shape of FIG. 1, they may assume the concavely arcuate configuration 14a, the convexly beveled configuration 14b, or the straight, truncated, beveled configuration 14c, of FIG. 3. These configurations may be reversed, if desired, while still achieving the objects of the invention.

The closed, reach end of bar 10 is solid and provided with screw means 16 for mounting a selected cutting tool 18. The construction and location of the cutting tool mounting means on bar 10 obviously may be varied to suit the particular purpose and apparatus at hand. Likewise, the length of the solid portion of the bar may be varied as required to accommodate the particular tool mounting means employed.

The open, inner or shank end of bar 10 has an internally threaded segment 20 and a set screw 22.

Bore 12 of bar 10 receives a stabilizing or damping rod 24, the function of which is to damp any vibrational movement which may be induced in the holder during the cutting operation.

Rod 24 is dimensioned so that when it is centered in bore 12, it is spaced laterally from the side walls of the bore by a distance of, for example, from 1/64 inch to 1/4 inch, preferably about 1/32 inch. Also, the rod is somewhat shorter than the longitudinal dimension of bore 12 in bar 10. It thus is possible for the rod to move both laterally and longitudinally with respect to the case in which it is housed.

The exterior configuration of stabilizing rod 24 may be varied, as shown in FIG. 4. Thus it may be cylindrical as indicated by rod 24a of FIG. 4. In the alternative, where a particularly stiff and strong rod is desired, it may be uniformly tapered as indicated by rod 24b of FIG. 4. Still further, again where stiffness and strength are required, it may be step-tapered as indicated by rod 24c of FIG. 4. In each case the bore of the casing in which the rod is housed will possess a matching configuration.

Stabilizing rod 24 is formed with a central, longitudinally extending recess 26, closed off at the reach end of the rod and communicating with the exterior through an outwardly flared segment 28 at the inner end of the rod.

Recess 26 is filled with a heavy, vibration-damping material, preferably a mixture of particles of a heavy solid in a liquid vehicle. Examples are lead and other metal chips suspended in oil, lead and other metal chips suspended in mercury, and sand suspended in mercury. By comparative tests, I have found tungsten chips having a size approximating the size of grains of sand suspended in mercury to be the most effective.

An alternate construction for the stabilizing rod comprises a lead bar having substantially the contour of rod 24, surrounded by mercury contained in recess 12.

All of the foregoing materials deaden the stabilizing rod vibration by increasing its vibrational damping constant. They also dissipate energy via the resistance to motion of solid particles in a viscous medium and the resistance to motion of a viscous medium. Still further, they increase substantially the mass of the stabilizing rod. These various factors cooperate in damping the vibration of the tool holder during use, as will appear hereinafter.

The reach end of stabilizing rod 24 is provided with an abutment end surface 30, which abuts against abutment surface 14 of bar 10. The end surface of the stabilizing rod may be convexly arcuate, as the surface 30a of FIG. 5, uniformly tapered with a blunt end, as indicated at 30b of FIG. 5, or uniformly tapered with a rounded end, as indicated at 30c of the same figure. However, in all cases the segments of the abutment surface of the stabilizing rod are divergent from the longitudinal axis thereof by an angle β (FIG. 1) of from 15–84°.

In accordance with my present discovery it is important to the superior performance of the tool holder that the angle ν of abutment surfaces 14 of the bar and end surface 30 of the stabilizing rod be divergent from each other by an increment of 1–25° (FIG. 1).

As a consequence of this relationship, there are provided meeting bearing surfaces between the abutment surfaces of the bar and the stabilizing rod end which are divergent from the longitudinal axis of the holder and also from each other, the degree of divergence of the bearing surfaces of the bar being greater than the degree of divergence of the bearing surface of the stabilizing rod end. This relationship makes possible both lateral and longitudinal movement of the stabilizing rod imparting to the assembly unique and remarkably effective damping properties.

The flared open inner end 28 of stabilizing rod 24 is stopped with a matching tapered plug 32 secured in position by a locking pin 34 and provided with an outwardly projecting stem 36. The stabilizing rod assembly then is located in the bore 12 of the hollow bar 10 by retainer means 38 which, cooperating with abutment surfaces 14, 30 centers the stabilizing rod within the bore, returns it to an equilibrium position after each longitudinal displacement and permits lubrication of the meeting bearing surfaces.

Retainer 38 is provided with an externally threaded head section 40 which may be threaded into section 20 of bar 10; an Allen head socket 42; an annular recess 44 dimensioned to receive set screw 22; a partial longitudinal bore 46 dimensioned to receive and guide stem 36 of plug 32; and an annular recess 48 dimensioned and positioned to receive sealing ring 50. Resilient compression means comprising a compression spring 52 is seated within bore 46 and arranged normally to press plug 32 outwardly with reference to retainer 38.

Stabilizing rod 24 thus is centered radially, in part by stem 36, in part by abutment surfaces 14, 30. After any displacement, it is returned to its centered equilibrium position by the action of spring 52, the force of which may be adjusted by threading retainer 38 inwardly or outwardly by means of a wrench inserted in socket 42. In addition, a lubricant such as graphite or molybdenum sulfide may be introduced into the space between stabilizing bar 24 and the side walls of bore 12. It is prevented from escaping by seal ring 50.

The tool holder thus comprised may be mounted in the tool holder clamp 54 of a lathe. By making superficial alterations, it also may be mounted in a variety of machines such as milling, drilling, boring or grinding machines, or in general any equipment where the cutting tool is held stationary and the work rotated, or vice versa.

An alternate form of the invention is illustrated in FIG. 6. In this embodiment both ends of the stabilizing rod are centered radially by means of relatively divergent abutment or bearing surfaces.

In the FIG. 6 form of the invention there is provided a hollow bar or case 60 having a longitudinal bore 62. A stabilizing rod 64 is received within the bore of the case just as stabilizing rod 24 is received within the bore of hollow bar 10. As before, the interior of the stabilizing rod is packed with a heavy packing 66, such as a suspension of tungsten metal chips in mercury.

However, instead of being open, as previously described, the inner end of the stabilizing rod is closed, the exterior end surface being convexly arcuate to provide bearing surface 68. This bears against surfaces 70 provided by an abutment member 72 having a longitudinally extending stem 74.

Member 72 is held in place by retainer 76 threaded into the open end of case 60 and secured with set screw 78. Retainer 76 is formed with a longitudinal recess 80 which houses a compression spring 82 and slidably receives the stem 74 of member 72. A seal ring 84 seated in an annular recess on the retainer prevents leakage of lubricant or other fluid which may be present in the interior cavity of the tool holder.

An assembly thus is provided in which abutment surfaces 68, 70 at the shank or inner end of the holder cooperate with corresponding surfaces at the reach end of the same in centering the stabilizing rod 64 radially in case 60.

In FIG. 7 there is illustrated a tool holder also embodying the principle of the invention, which is particularly stiff and strong. This effect is achieved by mounting a tapered stabilizing rod within a correspondingly tapered bore in the support bar.

An outer casing 90 of tapered configuration is provided with a longitudinal bore 92 of matching configuration which extends the entire length of the casing, being open at both ends. A hollow stabilizing rod 94 of matching tapered configuration, filled with a heavy mixture 96 of metal chips in mercury or other packing, is seated in bore 92.

The reach end of stabilizing rod 94 is closed with a plug 98 which is secured by means of a pin 100. The exterior end surface of plug 98 is convexly arcuate to form a bearing surface 102.

Surface 102 of plug 98 bears against surfaces 104 of an abutment plug 106 which is pressed into the open reach end of casing 90 and held in place by pin 108. Plug 106 serves the further important function of mounting a cutting tool 110, which releasably is held in place by means of screw 112.

The meeting bearing surfaces 102, 104 are divergent with reference to each other as well as to the longitudinal axis of the tool holder. As in the previously described embodiment, the degree of divergence of the bearing surface of the abutment plug is greater than the degree of divergence of the bearing surface of the stabilizing rod, with the result that the stabilizing rod is free to move laterally and longitudinally with respect to the casing in which it is received.

Longitudinal movement of the stabilizing rod is opposed by a compression spring 114 mounted in the inner or shank end of casing 90 and retained by retainer 116. The latter is threaded into a threaded internal section of the casing and is provided with both a wrench socket 118 and a sealing ring 120. These have the functions previously described.

In the form of the invention illustrated in FIGS. 8 and 9, the stabilizing rod is arranged externally of the bar mounting the tool, although its principle of operation is the same.

In this form of the invention a bar 130, which may be solid, is mounted between supports 132, 134. It in turn mounts a tool holding collar 136 secured by means of screw 138 and supporting a cutting tool 140. The body of the collar is formed with an annular, beveled recess 142 which serves as the abutment surface against which the stabilizing rod bears.

The stabilizing member in this case is a hollow rod 144. The reach end of the rod has a threaded section 146 and an annular L-shaped flange 148. The latter forms a recess or cavity which is packed with a heavy mixture 150 of, for example, tungsten or other metal chips in mercury. A cap 152 is threaded on threaded section 146 of the rod and seals off the opening of the recess.

The reach end of rod 144, outside cap 152, is formed with an annular beveled surface 154. This bears against or abuts surface 142 of collar 136. As before, the angles of the abutting surfaces are arranged so that they are divergent with respect to each other by an amount of from 1–25°, thus making it possible for stabilizing rod 144 to move both laterally and longitudinally with respect to bar 130.

Longitudinal movement of the stabilizing rod is controlled by an assembly mounted on the inner or shank end of the tool holder.

The inner end of hollow stabilizing rod 144 is provided with a flange 156. The inner end of support bar 130 mounts a collar 158 held in place by set screws 159. It is provided with a longitudinal recess 160.

Compression springs 162 are seated in the recess. One end of each spring bears against flange 156 of the hollow stabilizing rod. The other end bears against a retainer 164 which slides in recess 160 and may be positioned by adjustment of screws 166. The springs thus act to return the stabilizing rod to its equilibrium position after each displacement.

*Operation*

Although the various forms of the invention described herein differ in certain structural features, they have a common mode of operation.

In each case, the reach end of the stabilizing rod is forced against the abutment surfaces of the support bar by adjustable spring tension applied to the inner end of the stabilizing rod. The rod thus is centered radially while having freedom of longitudinal motion against the tension of the spring.

The stabilizing rod also has freedom of transverse motion because of the radial clearance which exists between it and the supporting bar. The movement of the stabilizing rod relative to the bar may be controlled both by adjusting the spring tension and by establishing a predetermined ratio of divergence or taper of the end of the stabilizing rod with respect to the abutment surfaces of the bar.

Accordingly, when the tool holder is in use, with the cutting tool applied to the work, any sudden, forceful transverse component of motion of the bar, which normally causes chatter, is resisted by the inertia of the heavy stabilizing rod. This causes relative transverse motion of the bar with respect to the stabilizing rod.

The reach end of the stabilizing rod thereupon will move up the inclined abutting surface of the bar, translating a portion of the transverse movement of the bar into longitudinal movement of the stabilizing rod. The amount of such movements is determined by the slope of the abutment surface.

As the stabilizing rod moves longitudinally, it compresses the spring which normally centers it radially in the equilibrium position. This transforms the kinetic energy of the stabilizing rod into potential energy of the spring.

The spring upon decompression transforms this potential energy into reverse longitudinal motion of the stabilizing rod. This forces the reach end of the stabilizing rod down along the tapered abutment surface to its radially centered equilibrium position. The motion of the stabilizing rod causes it to impart a component of transverse force to the supporting bar, quelling further motion of the latter and hence arresting chatter.

The foregoing sequence occurs in rapid succession during the cutting operation. Any energy dissipated by the friction produced between the rubbing bearing surfaces is minimized by lubrication. This maximizes the transfer of energy from the transverse motion or chatter of the bar to longitudinal motion of the stabilizing rod and thus increases the efficiency with which the tool holder works.

As a result, the tool holder overcomes chatter so effectively that present day carbide cutting tools may be used at their maximum capacity. Operating speeds may be increased ten or more times with overhangs of 8 to 1 without inducing chatter. Both set up time and operating time markedly are reduced. Tool damage is minimized and tool life increased.

Because of its increased operating speed, the boring bar has been transformed into an all purpose tool holder which may be used to great advantage in such operations as those of boring, threading, parting, retting, facing and turning. All of these advantages are achieved, furthermore, using a tool holder of simple, inexpensive construction, suited for use in the average shop.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A tool holder comprising
   (a) a support bar,
   (b) tool mounting means on the bar for mounting a cutting tool thereon,
   (c) a stabilizing rod mounted on the bar substantially coaxially therewith and laterally spaced therefrom,
   (d) abutment means on the bar for longitudinal abutment by one end of the stabilizing rod,
   (e) the abutment means and the stabilizing rod end having meeting bearing surfaces which are divergent with reference to each other and to the longitudinal axis of the bar,
   (f) the degree of divergence of the bearing surface of the abutment means with reference to the longitudinal axis of the bar being greater than the degree of divergence of the bearing surface of the stabilizing rod end with respect thereto,
   (g) the bearing surface of the abutment means thereby providing an inclined plane adapted to translate lateral displacement of the bar into longitudinal displacement of the stabilizing rod,
   (h) and resilient compression means mounted on the bar and positioned to oppose the longitudinal displacement of the stabilizing rod, returning the rod toward an equilibrium position after each longitudinal displacement thereof.

2. The tool holder of claim 1 wherein the stabilizing rod is provided with a recess, the recess being filled with a mixture of liquid and heavy solid particles.

3. The tool holder of claim 1 wherein the stabilizing rod is provided with a recess, the recess being filled with metal chips and mercury.

4. The tool holder of claim 1 wherein the stabilizing rod is provided with a recess, the recess being filled with tungsten chips and mercury.

5. The tool holder of claim 1 including lubricating means for lubricating the bearing surfaces of the abutment means and stabilizing rod end.

6. The tool holder of claim 1 wherein the difference between the degrees of divergence of the bearing surfaces of the abutment means and stabilizing rod end is from 1–25°.

7. The tool holder of claim 1 wherein the degree of divergence of the bearing surface of the abutment means from the longitudinal axis of the bar is from 20–85°, the degree of divergence of the bearing surface of the stabilizing rod end from the longitudinal axis of the bar is from 15–84° and the difference between the degrees of divergence of the bearing surfaces of the abutment means and the stabilizing rod end is from 1–25°.

8. A tool holder comprising an elongated casing,
   (a) tool mounting means on the casing for mounting a cutting tool thereon,
   (b) the casing having an axial bore extending inwardly from one end thereof and terminating adjacent the tool mounting means,
   (c) an elongated stabilizing rod in the bores having a cross section smaller than the cross section of the bore,
   (d) the inner end surface of the bore providing abutment means for longitudinal abutment by the inner end of the stabilizing rod,
   (e) the abutment means and stabilizing rod inner end having meeting bearing surfaces which are divergent with reference to each other and to the longitudinal axis of the casing,
   (f) the degree of divergence of the bearing surface of the abutment means with reference to the longitudinal axis of the casing being greater than the degree of divergence of the bearing surface of the stabilizing rod end with respect thereto,
   (g) the bearing surface of the abutment means thereby providing an inclined plane adapter to translate lateral displacement of the casing into longitudinal displacement of the stabilizing rod,
   (h) and resilient compression means mounted on the casing and positioned to oppose the longitudinal displacement of the stabilizing rod, returning the rod toward an equilibrium position after longitudinal displacement.

9. The tool holder of claim 8 wherein the inner abutment surface of the axial bore in the casing is concavely arcuate with respect to the stabilizing rod.

10. The tool holder of claim 8 wherein the inner abutment surface of the axial bore in the casing is concavely tapered with respect to the stabilizing rod.

11. The tool holder of claim 8 wherein the inner abutment surface of the axial bore in the casing is concavely tapered, the tapered surface being conversely arcuate.

12. The tool holder of claim 8 wherein the stabilizing rod is cylindrical in cross section.

13. The tool holder of claim 8 wherein the stabilizing rod is longitudinally tapered in configuration.

14. The tool holder of claim 8 wherein the stabilizing rod is step-tapered in configuration.

15. The tool holder of claim 8 wherein the stabilizing rod end is convexly arcuate.

16. The tool holder of claim 8 wherein the stabilizing rod end is convexly tapered with a square tip.

17. The tool holder of claim 8 wherein the stabilizing rod end is convexly tapered with a convexly rounded tip.

18. The tool holder of claim 8 wherein the inner abutment surface of the casing is concavely tapered, the stabilizing rod is cylindrical, and the outer end of the stabilizing rod is convexly arcuate.

19. The tool holder of claim 8 wherein both ends of the stabilizing rod are provided with bearing end surfaces and including a spring-pressed abutment member slidably mounted in the open end of the bore, the abutment member having an abutment surface engaging the adjacent bearing end of the stabilizing rod.

20. A tool holder comprising an elongated support bar,
   (a) tool mounting means on the bar for mounting a cutting tool thereon,
   (b) a hollow stabilizing rod open at both ends and having a tapered bearing end telescoped over the bar,
   (c) a collar on the bar mounting the other end of the rod,
   (d) resilient compression means mounted on the collar and bearing against the adjacent end of the rod and
   (e) abutment means on the bar,
   (f) the bearing end on the rod being pressed by the compression means into bearing engagement with the abutment means on the bar,
   (g) the bearing surfaces of the rod end and abutment means being divergent with reference to each other and to the longitudinal axis of the bar.

No references cited.

WILLIAM W. DYER, Jr., *Primary Examiner*,